Oct. 18, 1966  J. F. SANDELIEN  3,280,312
SYSTEM FOR MEASURING KILN CONDITIONS USING THERMOCOUPLES
IN COMBINATION WITH A MATHEMATICAL MODEL
Filed Dec. 11, 1962  2 Sheets-Sheet 1
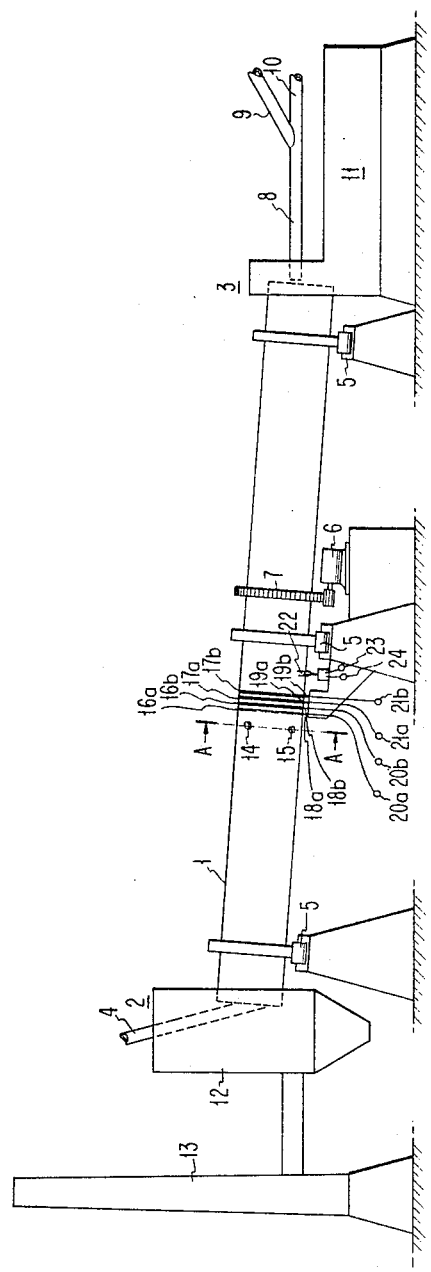
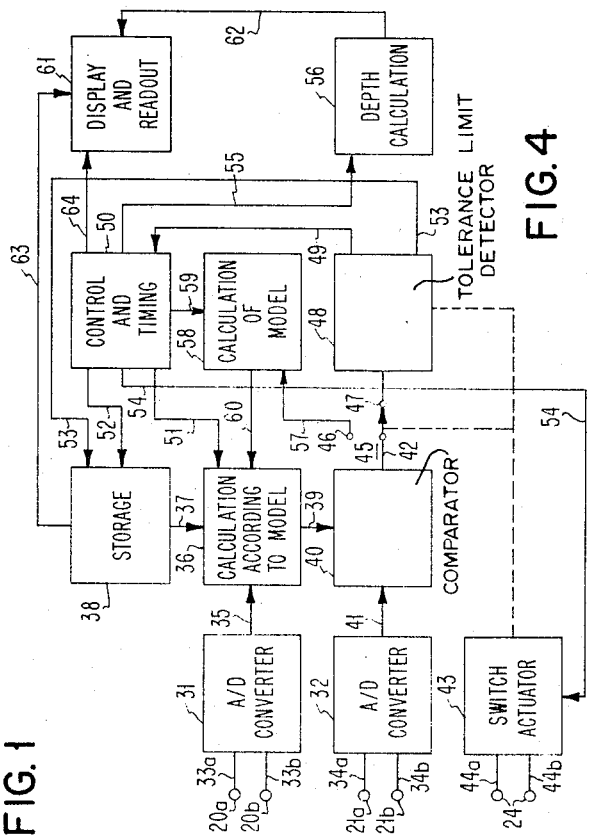
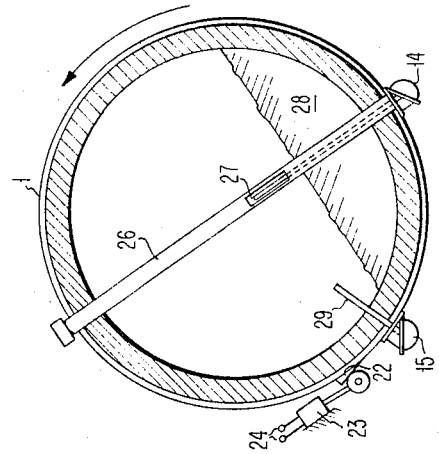
INVENTOR.
JOAKIM F. SANDELIEN
BY
ATTORNEY Oct. 18, 1966 J. F. SANDELIEN 3,280,312
SYSTEM FOR MEASURING KILN CONDITIONS USING THERMOCOUPLES
IN COMBINATION WITH A MATHEMATICAL MODEL
Filed Dec. 11, 1962 2 Sheets-Sheet 2

United States Patent Office 3,280,312  
Patented Oct. 18, 1966

3,280,312  
SYSTEM FOR MEASURING KILN CONDITIONS USING THERMOCOUPLES IN COMBINATION WITH A MATHEMATICAL MODEL  
Joakim F. Sandelien, San Jose, Calif., assignor to International Business Machines Corporation, New York, N.Y., a corporation of New York  
Filed Dec. 11, 1962, Ser. No. 243,799  
2 Claims. (Cl. 235—151.3)

This invention relates to computer control systems and, more particularly, to an improved computing means for determining bed depth and material temperature in a rotary kiln.

A prerequisite to effective control of a rotary kiln is fast, accurate information on the conditions within the kiln. Since the temperatures involved preclude visual observation and prevent the use of most instruments, this information is gathered for the most part by means of thermocouples. With knowledge only of the kiln position and the location of the thermocouple well in the kiln wall, it is virtually impossible to determine the gas and solid material temperature or the depth and quantity of solids at the thermocouple location.

The thermocouple output provides a signal which is generally sufficient to hold the kiln operation within safe operating limits, but the accuracy and information content is not sufficient to achieve optimum yield from the process.

A typical thermocouple will not respond immediately to temperature changes. The time lag will vary with the protection around the thermocouple as well as the nature of the environment. For example, a typical response time in a liquid such as water is 12 seconds, while the response time of the same device in air is approximately 2 minutes. While this represents extremes, it is nevertheless obvious that a true picture of the thermocouple transition from the gas to the material zone as the kiln rotates, is exceedingly difficult to obtain. While the response to a change from gas to material may be relatively fast, the change from material to gas produces a very slow, indistinct reaction.

This response time prohibits the performance of calculations which provide the bed depth within the kiln. If the exact time when the thermocouple entered and left the material could be determined, it would be a simple matter to calculate the bed depth knowing the kiln geometry and speed of rotation.

The response time of a thermocouple in the hotter regions of the kiln is generally much longer than the time available for a reading. The indicated temperature is never indicative of the true temperature of either the gas or material since it depends on at least four variables. Bed depth, material temperature, gas temperature and thermocouple response characteristics all are important factors in the indicated temperature. For example, a decrease in thermocouple output could be caused by greater bed depth, lower gas temperature, lower material temperature or a change in response due to a coating of slag about the thermocouple well. The control action necessary to restore proper operating conditions will vary depending upon the reason for the decreased indication, but there has been no satisfactory way to determine which variable is responsible for the change.

The system described herein uses two thermocouples at each point along the kiln at which bed depth and material temperature are to be determined. The first thermocouple is located so as to remain in the gas zone at all times. This is accomplished by positioning it at some distance away from the kiln wall so that it is never submerged in the material. The second thermocouple is positioned close to the kiln wall so that it is alternately covered and uncovered by the solid material as the kiln rotates.

Since the first thermocouple remains in the gas at all times, it provides a stable reference against which readings from the second thermocouple may be compared. It is possible, by means of a mathematical model, to predict the reading of the second thermocouple after determining the gas temperature from the first thermocouple.

One equation or model describes the thermocouple as it responds to the solids, and a second equation is used in the gaseous phase. After determining the gas temperature by means of the first thermocouple, the actual output of the second thermocouple is compared to predicted values based on the solids or gaseous model, depending upon the previous comparisons. When the model which has been used to successfully predict the previous readings fails to provide accuracy to the predetermined tolerance, it is known that the thermocouple has changed from the gaseous to the solids phase, or vice versa. The other model may then be used until this also fails to correctly predict the reading and, therefore, defines the other transition point.

While two equations or models provide the most accurate determination of temperature and bed depth, in many cases a single equation will suffice. In such situations the model is merely subjected to a different forcing function which is dependent upon the gas or material temperature. When the second thermocouple is in the gas, the input to the model is the temperature of the gas and when the predicted reading falls outside the acceptable tolerance, the input to the model is changed to the last determined temperature of the material.

The nature of the application and the desired accuracy will generally determine which approach is to be used.

It is, therefore, an object of my invention to provide an improved kiln control system.

Another object of my invention is to provide a system which overcomes the time lag normally present in a thermocouple.

Still another object is to provide an accurate method for determining the temperature and depth of material in a rotary kiln.

A still further object is to provide means for determining the entry and departure of a thermocouple in the solids phase by means of a second thermocouple and a mathematical model.

The foregoing and other objects, features and advantages of the invention will be apparent from the following more particular description of a preferred embodiment of the invention, as illustrated in the accompanying drawings.

In the drawings:

FIG. 1 is a schematic view of a rotary kiln.

FIG. 2 is a cross section along the lines A—A of the kiln shown in FIG. 1.

Figure 3A:
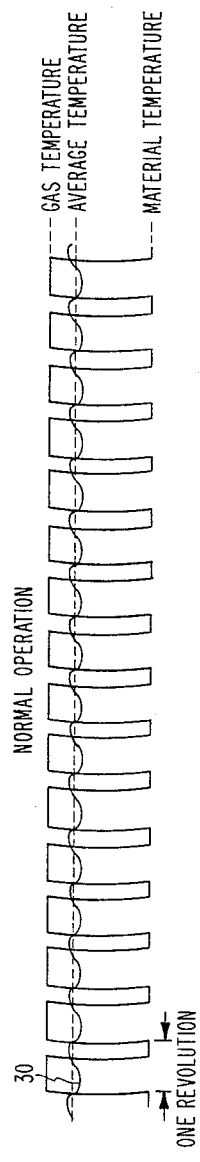

FIGS. 3A to 3D inclusive are graphs showing thermocouple response to temperature variations within a kiln.

FIG. 4 is a schematic drawing of a computer for performing the invention.

The rotary kiln 1 of FIG. 1 has a feed end 2 and a discharge end 3. The material to be processed is loaded into the kiln by the feed means 4. Rotation of the kiln 1 on bearings 5 is accomplished by motor 6 and drive gear 7. A firing system 8 has an air inlet 9 and a fuel inlet 10. Additionally, air is available from the cooler 11. In operation, the hot gases produced by the firing system 8 pass through the length of the kiln heating the material therein. Upon emerging from the kiln the gases are stripped of such dust as may be present by dust collector 12 and then pass into the stack 13.

Thermocouples 14 and 15 are connected by suitable leads to slip rings 16a, 16b and 17a, 17b, respectively.

Brushes 18*a*, 18*b* and 19*a*, 19*b* engage the slip rings during rotation of the kiln to provide an output at connected terminals 20*a*, 20*b* and 21*a*, 21*b* representative of the respective thermocouples. Thermocouples 14 ano 15 are mounted in suitable wells projecting through the kiln wall. This allows the temperature within the kiln to be sampled while protecting the thermocouple.

A cam 22 on kiln 1 coacts with switch 23 to identify the kiln position by means of the signal at terminals 24.

The arrangement of thermocouples 14 and 15 is best understood from FIG. 2. A protecting well 26 which passes hrough the kiln serves to protect thermocouple 14. An aperture 27 in well 26 allows the gases present in the kiln to register against the thermocouple 14 so that a proper temperature reading is obtained.

To prevent the material 28 being processed within the kiln from directly influencing the reading obtained at thermocouple 14, aperture 27 is located close to the center of the kiln. In this manner the true gas temperature is always indicated.

The second thermocouple 15 is positioned within a protective well 29. In this case the thermocouple is located very close to the kiln wall so that it is alternately covered and uncovered by material 28 as the kiln rotates.

While thermocouples 14 and 15 may be of any suitable type, and this will depend somewhat on their position within the kiln, it is desirable that the combination thermocouple 15 and well 29 have the lowest possible thermal inertia so that temperature changes are followed more closely. Satisfactory performance has been obtained with a configuration in which the thermocouple junction is welded to the protective housing to improve the heat transfer.

With even the best responding thermocouple it is not possible to obtain a true picture of kiln conditions as shown in FIGS. 3A to 3D. The actual temperature registered by thermocouple 15 follows the curve 30, shown in FIGS. 3A, 3B, 3C and 3D. The upper limit of the square wave is the temperature of the gas, which may be 2400° F. The lower limit of the wave represents the temperature of the material being processed within the kiln and may be 1550° F. These figures are typical and will vary depending upon operating conditions and the thermocouple placement along the kiln.

While the environment of thermocouple 15 changes very abruptly due to rotation of the kiln, the 950° temperature change affects the thermocouple output only slightly as shown in FIG. 3A. In a typical case the thermocouple may indicate a change of only 70°. This is due in part to the heat absorbed by the protective shield about the thermocouple which tends to smooth out the response.

Figure 3B:
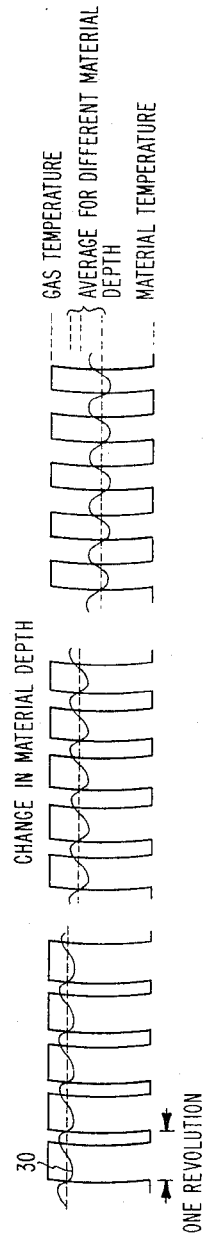

From the thermocouple response curves of FIG. 3B it can be seen that the output level of the thermocouple 15 is affected when the depth of the material is increased as in FIG. 3B. As the depth is increased thermocouple 15 tends to remain in the material a longer portion of each revolution, and the amplitude of curve 30 increases while the average reading is lowered. The converse applies when the bed depth is decreased.

Figure 3C:
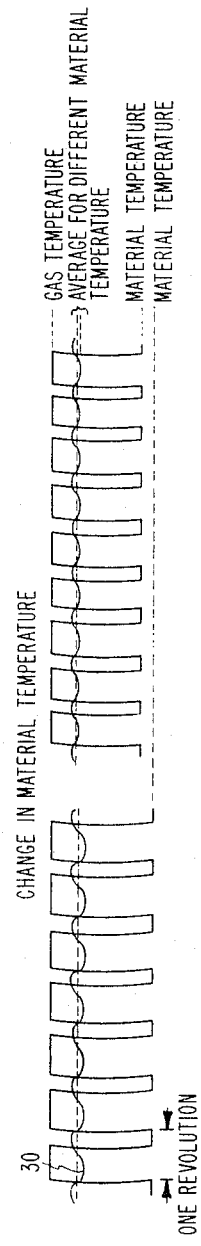

Should the material increase in temperature as shown in FIG. 3C the indicated changes in temperature, i.e., the amplitude of curve 30, become lower, and the average reading increases. The converse applies when the material temperature is decreased.

Figure 3D:
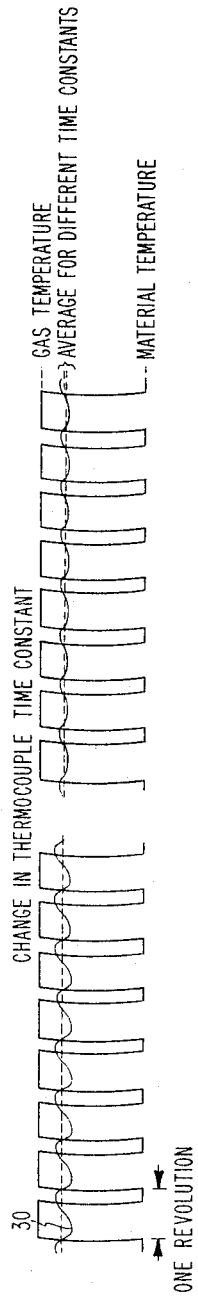

Changes in the time constant of thermocouple 15 are shown in FIG. 3D. In the first portion of the curve a normal response is obtained. The latter portion illustrates the effect of a slag or other residue around the thermocouple well. Such a coating slows down the transfer of heat to and from the thermocouple and thereby reduces the changes indicated by the curve 30. The amplitude of the signal variations is reduced, and the average reading becomes somewhat higher.

All the curves of FIG. 3 assume that the gas temperature remains relatively constant, and the changes are due to other factors.

The average reading, by itself, is obviously meaningless, since it does not provide a true indication of either the gas or material temperature and can be changed by a variety of factors.

Since there is no way to hold a thermocouple within the material as the kiln rotates, the material temperature has never been satisfatorily determined during actual operation.

From FIGS. 3A to 3D it can be seen that the output of thermocouple 15 follows a regular curve which changes in amplitude and shape, depending upon the variables which determine it. The most important variables are the gas temperature, the material temperature, thermocouple time constant and the relative time during which the thermocouple is in the material or the gas. The other influences on the thermocouple are fixed and may be determined from experiments or the basic laws of physics. Derivation of the fixed relationships and their relation to the variables is known as constructing a mathematical model. This model defines the unknown variable in terms of those which can be determined and a transfer function. The technique of constructing such a model is well known. A description of the procedure and additional references are contained in Handbook of Automation Computation and Control, John Wiley & Sons, 1961, vol. 3, Section 13, pages 13–01 through 13–31.

For example, the model could be a linear relation between the variables and the predicted temperature of the thermocouple such as: Predicted output of thermocouple $= K_1$ times gas temperature $+ K_2$ times material temperature $+ K_3$ times length of time in material, where $K_1$ to $K_3$ are numerical constants defining the particular thermocouple used. Using the above linear relationship one can calculate (i.e. predict) what the output from the thermocouple would be for a particular value of material temperature, gas temperature, and time in the material. Of course, a more refined model would provide greater accuracy, but nevertheless, a simple linear model could be used.

Experimental data provides the thermocouple time constants. From the thermocouple 14 the temperature of the gas may be found, eliminating this as an unknown, but leaving both bed depth and material temperature as unspecified quantities to be determined according to the mathematical model.

It has been found that derivation of the mathematical model may be simplified by determining the material temperature with a high speed thermocouple which reaches equilibrium during the period it is covered with material. Such thermocouples are short lived and not suited for continuous use, but serve to verify or correct the mathematical model.

After the mathematical model has been derived and the kiln is in operation with an unspecified bed depth at at unknown temperature, operation of the system begins with the connection of terminals 20*a*, 20*b* and 21*a*, 21*b* of thermocouples 14 and 15 to the analog to digital converters (hereafter referred to as ADC) 31 and 32, respectively, of FIG. 4. These converters accept the low level signal from the thermocouples on lines 33*a*, 33*b* and 34*a*, 34*b* and convert it to a digital signal representing temperature.

The digital output of ADC 31 appearing on line 35 is connected to the calculating means 36. This calculating means performs according to the mathematical model of the thermocouple 15, and predicts the reading of thermocouple 15 on the basis of the signal on line 35 and a second input on line 37 representing an assumed temperature from storage means 38.

The assumed temperature represents an estimate of the material temperature at the beginning of operation. This may be a reasonable value based on calculations or experiment. During the time thermocouple 15 is in the gas zone, the predicted reading is calculated from the actual temperature as measured by thermocouple 14.

The output of calculating means 36 appears on line 39 which is one input to comparator 40. The other input to comparator 40 is on line 41 which is the digital output of ADC 32. The output of comparator 40 on line 42 represents the difference between the actual reading of thermocouple 15 and the prediction according to the mathematical model within calculator means 36.

At the beginning of the period when thermocouple 15 may be expected to enter the material, switch actuator 43 connected to terminals 24 of switch 23 by lines 44a, 44b responds to closure of switch 23 by moving switch 45 from terminal 46 to terminal 47. This initiates the checking procedure by tolerance limit detector 48. Cam 22 and switch 23 are located so that switch 45 is always actuated prior to thermocouple 15 entering the material 28. The output of comparator 40 at the time switch 45 is changed from terminal 46 to terminal 47 represents the difference between the predicted reading of thermocouple 15 in the gas zone and the actual reading of thermocouple 15 in the gas zone. The initial comparisons will normally be quite close and well within the tolerance band. However as the kiln continues to rotate, thermocouple 15 is covered with material at a lower temperature than the gas, and the actual reading becomes lower than the predicted reading by an amount which exceeds the tolerance. When the tolerance is exceeded, tolerance limit detector 48 produces a signal on line 49 to the control and timing unit 50. This is recorded as the time of entry into the material zone.

At this point the control and timing unit 50 provides an output signal on line 51 to calculating means 36 and a control signal to storage means 38 on line 52. The signals on lines 51 and 52 cause calculating means 36 to predict, on the basis of the mathematical model, the reading of the thermocouple 15. As previously mentioned, the prediction is based on the actual gas temperature when thermocouple 15 is in the gas zone and on an assumed temperature when it is in the material zone. Since the first output signal from tolerance limit detector 48 indicates a transition from gas to solid, control unit 50 alters the input to calculating means 36 by substituting an assumed value for the material temperature, which then replaces the actual measured gas temperature in computing the predicted reading for thermocouple 15.

The prediction for thermocouple 15 is made continuously during the period when it is within the material zone. It is quite likely that the initial assumed value for the material temperature will be incorrect to the extent that the predicted reading for thermocouple 15 will be out of tolerance. When this is the case, the output of the limit detector 48 on line 53 is used to correct the assumed material temperature placed in storage 38. After a number of trials, determined by the accuracy of the system, the predicted readings fall within the range allowed by the tolerance limit detector 48.

During normal operation tolerance limit detector 48 checks the output of comparator 40 after a time delay determined by switch actuator 43 so that the test is made prior to entry into the gas zone. When the difference between the predicted and measured values exceeds the tolerance, a second output signal is produced on the line 49. The two signals define the time of entry into the material zone and the time of departure therefrom. The control and timing unit 50 does several things upon receipt of the second signal on line 49.

First, it operates switch actuator 43 by means of a signal on line 54 to change switch 45 from terminal 47 to terminal 46. The effect of this change is to discontinue temporarily the tolerance check. Second, a signal is developed on line 55 to the depth calculating means 56 to identify the fraction of the revolution during which thermocouple 15 was in the material zone. Third, by means of signals on lines 51 and 52, the prediction performed by calculating means 36 is changed by substituting the actual gas zone temperature, as measured by thermocouple 14, for the estimated material temperature.

It is noted that unit 50 provides a signal on line 55 to depth calculation means 56. That signal identifies the fraction of the revolution (hereinafter referred to as $\theta$) during which thermocouple 15 is in the material zone. Knowing that quantity, it is a simple geometrical calculation to determine the depth of material. Formulas of the type used may be obtained by referring to Rinehart Mathematical Tables, Formulas and Curves; Rinehart and Co., New York; 1956. For example, multiplying the circumference of the kiln by the fraction of a revolution that thermocouple 15 is in material 28 (i.e. signal 55) gives you the length of the arc covered by the material. The angle $\theta$ can then be calculated from the formula $$\theta = \frac{S}{R}$$

where R is the radius of the kiln.

Knowing R and $\theta$, the chord C across the top of the material can be calculated from the formula $$C = 2R \sin \tfrac{1}{2} \theta$$

Once C is known, depth H may be calculated by solving the following equation $$4H^2 - 8HR + C^2 = 0$$

where R and C are known from previous measurements and calculations.

The above calculation is just one of several approaches that could be used to solve for the depth of material 28. The mathematical relationships are simple, well known (as shown by the above-cited reference), and could readily be implemented on a digital or analog computer of the type available in December 1962.

In some cases it may be desirable to vary the model used by calculator means 36 as a function of the location of thermocouple 15. The model for the thermocouple in gas is slightly different from that which defines thermocouple response in a solid material. Where the desired accuracy is not obtained with a single model, the control unit 50 can also change models at the transition points.

While both thermocouples are in the gas zone it would not be essential to continue the operation of the calculating means 36, since the transition point will always take place after the closure of switch 24. The overall accuracy of the system tends to deteriorate as the thermocouple response changes. While this is a relatively long term process, it has been found desirable to correct the model at frequent intervals. This correction is accomplished by feeding the output of comparator 40 to input line 57 of model calculating means 58. Any error in prediction must be due to an error in the model, since the actual temperature to which the thermocouple 15 is exposed is measured by thermocouple 14.

In response to a signal from the control unit 50 on line 59, the calculating means 58 recomputes the mathematical model of thermocouple 15 on the basis of the indicated error on line 57. The revised model is transferred to calculating means 36 on line 60 and is used in succeeding predictions for the reading of thermocouple 15.

When the system has had sufficient time to settle out, the corrected, assumed value for the material temperature will be in storage 38, and the bed depth will be determined by the depth calculator 56. These values are essential to the solution of the kiln control problem and are transferred to display and readout means 61 over lines 62 and 63 under the control of a signal on line 64 from control unit 50. Manipulation of these values subsequent to the transfer into display means 61 will vary depending upon the particular control system used to manipulate the kiln variables.

It will be appreciated that the computer described with reference to FIG. 4, while shown in specialized form, is capable of reproduction through programming of standard instructions on a conventional electronic computer having an internally stored program.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. Means for determining the location of material boundaries within a rotary kiln having zones of gas and material, comprising:

first temperature sensing means located within said kiln to provide an electrical signal indicating the temperature of said gas;

second temperature sensing means located within said kiln for providing an electrical signal which, at different times during kiln rotation, indicates the temperature of said gas and material zones;

calculating means, for predicting the reading of said second temperature sensing means in response to (a) the electrical signal from said first temperature sensing means, (b) an electrical signal representing the estimated material temperature and (c) an electrical signal from a mathematical model of said second temperature sensing means;

comparing means responsive to said calculating means and to said second temperature sensing means for comparing the predicted reading and actual reading of said second sensing means; and means for developing a signal responsive to the difference between said predicted and actual readings to indicate the boundaries between said gas and said material.

2. Means for refining the model of a temperature sensing means within a rotary kiln having zones of gas and material, comprising:

first temperature sensing means located within said kiln to provide an electrical signal indicative of the temperature of said gas;

second temperature sensing means located within said kiln for providing an electrical signal indicative of the temperature of said gas and material zones at different times during kiln rotation;

calculating means, for predicting the reading of said second sensing means when in said gas zone in response to the electrical signals from said first sensing means and a mathematical model of said second sensing means;

comparing means for comparing the predicted reading and the actual reading of said second sensing means; and means responsive to said comparing means for altering said mathematical model until said predicted and actual readings are in agreement.

References Cited by the Examiner

UNITED STATES PATENTS

| | | | |
|---|---|---|---|
| 2,443,960 | 6/1948 | O'Brien | 73—292 X |
| 2,883,651 | 4/1959 | Akerlund. | |
| 2,987,704 | 6/1961 | Gimpel et al. | 340—172.5 |
| 3,037,201 | 5/1962 | Kelley | 235—151 X |
| 3,103,817 | 9/1963 | Ludwig | 73—341 |
| 3,145,567 | 8/1964 | Bobrowsky | 73—295 |

MALCOLM A. MORRISON, *Primary Examiner.*

I. KESCHNER, *Assistant Examiner.*